US012585303B2

(12) United States Patent
Umejima et al.

(10) Patent No.: US 12,585,303 B2
(45) Date of Patent: Mar. 24, 2026

(54) ELECTRONIC APPARATUS AND CHASSIS MEMBER

(71) Applicant: LENOVO (SINGAPORE) PTE. LTD., Singapore (SG)

(72) Inventors: Kazuya Umejima, Yokohama (JP); Takehito Yamauchi, Yokohama (JP); Makoto Hashikura, Yokohama (JP); Yuzuru Doibata, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 132 days.

(21) Appl. No.: 18/613,709

(22) Filed: Mar. 22, 2024

(65) Prior Publication Data

US 2024/0393828 A1 Nov. 28, 2024

(30) Foreign Application Priority Data

May 26, 2023 (JP) ................................. 2023-087017

(51) Int. Cl.
*G06F 1/16* (2006.01)
(52) U.S. Cl.
CPC .......... *G06F 1/1616* (2013.01); *G06F 1/1662* (2013.01); *G06F 1/1681* (2013.01)
(58) Field of Classification Search
CPC .... G06F 1/1601; G06F 1/1613; G06F 1/1616; G06F 1/1633; G06F 1/1637; G06F 1/1656
See application file for complete search history.

(56) References Cited

U.S. PATENT DOCUMENTS

| | | | | |
|---|---|---|---|---|
| 2013/0329460 A1* | 12/2013 | Mathew | ................ | G06F 1/1637 |
| | | | | 362/612 |
| 2021/0153364 A1* | 5/2021 | Kosukegawa | ........ | G06F 1/1601 |
| 2024/0036610 A1* | 2/2024 | Perelli | .................. | G06F 1/1616 |
| 2024/0244774 A1* | 7/2024 | Huang | ................ | H05K 5/0217 |

FOREIGN PATENT DOCUMENTS

| | | |
|---|---|---|
| JP | 2021157611 A | 10/2021 |
| JP | 2021174256 A | 11/2021 |
| JP | 2022079985 A | 5/2022 |

* cited by examiner

*Primary Examiner* — Anthony Q Edwards
(74) *Attorney, Agent, or Firm* — SHIMOKAJI IP

(57) ABSTRACT

An electronic apparatus includes: a chassis member having an inner face, and a standing wall at an edge; and a display panel having a display surface, a rear face opposite the display surface, and an outer side face that stands between the display surface and the rear face, the rear face being supported by the inner face of the chassis member, the outer side face facing the standing wall of the chassis member. The display panel has a corner section on the outer side face. The standing wall has an inner wall face facing the outer side face of the display panel, and has a corner wall section on the inner wall face to go around the corner section. The corner wall section has a recessed portion recessed in a direction away from the corner section.

12 Claims, 6 Drawing Sheets

ELECTRONIC APPARATUS AND CHASSIS MEMBER

BACKGROUND OF THE INVENTION

Field of the Invention

The present invention relates to an electronic apparatus and a chassis member.

Description of the Related Art

An electronic apparatus such as a laptop PC includes a display panel including a liquid crystal display. Japanese Unexamined Patent Application Publication No. 2022-079985, for example, discloses a configuration in which a display panel is supported on the inner face of a chassis member having a standing wall at the edge.

SUMMARY OF THE INVENTION

A display panel as described above has corner sections. The standing wall of the chassis member that supports the display panel also has corner wall sections placed to go around the corner sections of the display panel. Thus, if such an electronic apparatus receives an impact due to a drop, for example, a corner section of the display panel will collide with the corner wall section of the standing wall, and one or both of them may be damaged. To avoid this, conventional electronic apparatuses have a sufficient gap left between the display panel and the standing wall to prevent a collision of them. However, enlarging the gap between the display panel and the standing wall leads to an increase in the width of the bezel surrounding the display surface of the display panel, degrading the appearance quality of the electronic apparatus.

In view of the problems of the conventional techniques, the present invention aims to provide an electronic apparatus and a chassis member capable of suppressing damage if an impact is given, and also suppressing deterioration in appearance quality.

An electronic apparatus according to the first aspect of the present invention includes: a chassis member having an inner face, and a standing wall at an edge; and a display panel having a display surface, a rear face opposite the display surface, and an outer side face that stands between the display surface and the rear face, the rear face being supported by the inner face of the chassis member, the outer side face facing the standing wall of the chassis member, the display panel having a corner section on the outer side face, the standing wall having an inner wall face facing the outer side face of the display panel, and having at least one corner wall section on the inner wall face to go around the corner section of the display panel, the at least one corner wall section having a recessed portion recessed in a direction away from the corner section.

A chassis member according to the second aspect of the present invention, the chassis member supporting a display panel, including: a standing wall disposed to go around a corner section of the display panel, the standing wall including a corner wall section facing the corner section; and a recessed portion in the corner wall section, the recessed portion being recessed in a direction away from the corner section.

The above-described aspects of the present invention are capable of suppressing damage if an impact is given, and also suppressing deterioration in appearance quality.

DETAILED DESCRIPTION OF THE INVENTION

Figure 1:
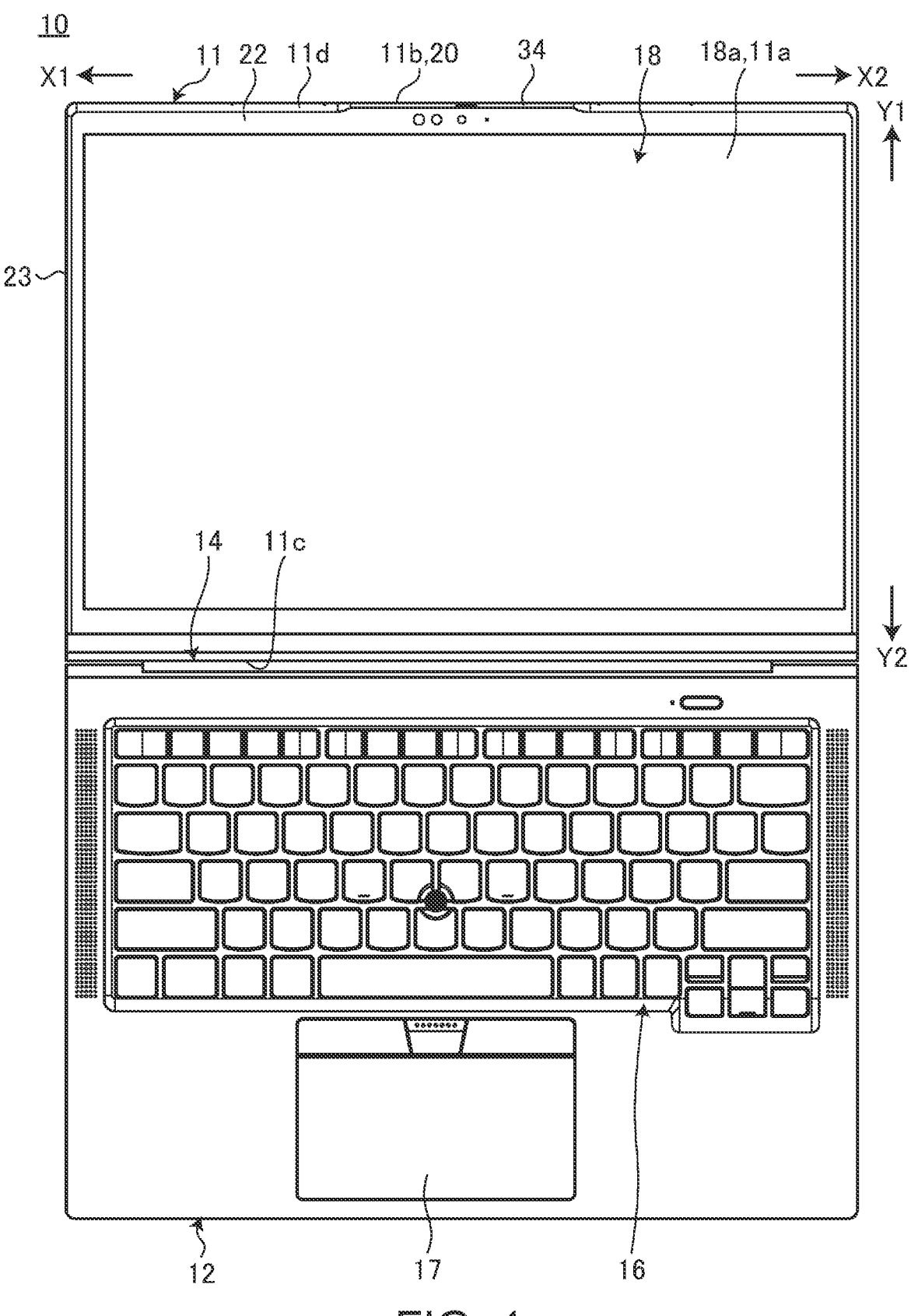
FIG. 1 is a schematic top plan view of an electronic apparatus according to one embodiment.

Referring to the drawings, the following describes an electronic apparatus and a chassis member according to the present invention in details by way of preferable embodiments.

FIG. 1 is a schematic top plan view of an electronic apparatus 10 according to one embodiment. As illustrated in FIG. 1, the electronic apparatus 10 of the present embodiment is a clamshell-type laptop PC including a first chassis 11 and a second chassis 12 that are relatively rotatably connected with hinges 14. The present embodiment exemplifies the electronic apparatus 10 that is a laptop PC, which may be of various types other than the laptop PC, including a stand-alone display device, a tablet PC, a mobile phone, a smartphone, and a portable game machine.

The second chassis 12 is a flattened box with a rectangular outer shape, and is adjacent to the first chassis 11. The second chassis 12 internally houses a motherboard with a CPU and other components mounted thereon and various types of electronic components such as a battery device, a memory and an antenna device. The second chassis 12 faces a keyboard 16 and a touchpad 17 on the top face.

The first chassis 11 has a rectangular outer shape, and is a flattened box that is thinner than the second chassis 12. The first chassis 11 comes with a display panel 18. The following describes the first chassis 11 and components mounted on the chassis with reference to the direction viewed from the user viewing the display surface 18a of the display panel 18, where the left and right directions are referred to as X1 and X2 directions, the top and bottom directions are referred to as Y1 and Y2 directions, and the depth directions are referred to as Z1 and Z2 directions. X1 and X2 directions may be collectively referred to as X direction, and Y1 and Y2 directions and Z1 and Z2 directions may also be referred to as Y direction and Z direction, respectively, in the same way.

The display surface 18a of the display panel 18 faces the Z1-side surface (front face 11a) of the first chassis 11. The first chassis 11 has a chassis member 20 that defines the Z2-side surface (back face 11b), and a bezel member 22 that defines a peripheral edge of the front face 11a. The top, bottom, left, and right side faces of the first chassis 11 are defined by a standing wall 23 that rises from the four peripheral edges of the chassis member 20. The bezel member 22 is a frame-shaped thin plate that surrounds the peripheral edge of the display panel 18. The hinges 14 are connected to the Y2-side edge (edge 11c) of the first chassis 11, and are covered by a bar-shaped hinge cover extending in the X direction.

Figure 2:
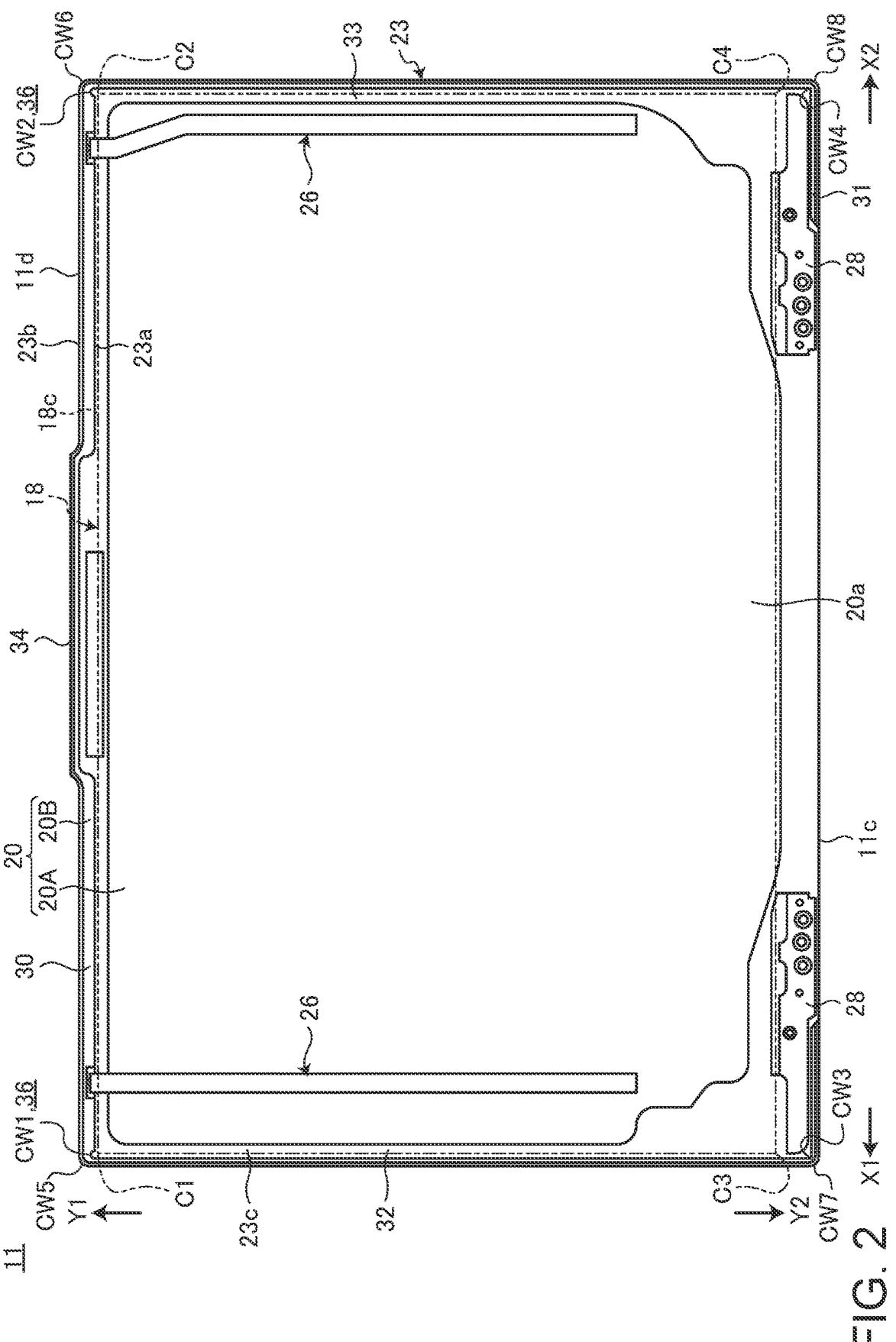
FIG. 2 is a schematic front view of a first chassis.

The display panel 18 includes a liquid crystal display or an organic EL display, for example. For instance, the display panel 18 is configured so that layers including, glass, a liquid crystal layer, and a light guide plate are stacked and the outer peripheral edges of these layers are fixed with double-sided tape, adhesive, or the like. The display panel 18 is fixed to the inner face 20*a* of the chassis member 20 on the rear face 18*b* opposite the display surface 18*a*. For instance, double-sided adhesive tape 26 is used for this fixation (see FIG. 2). Reference numeral 28 in FIG. 2 represents a pair of left and right metal brackets, to which the hinges 14 are screwed. These metal brackets 28 are fixed to the inner face 20*a* and placed along the edge 11*c*.

FIG. 2 is a schematic front view of the first chassis 11. FIG. 2 omits the bezel member 22, and illustrates the outer shape of the display panel 18 with the alternate long and two short dashes line. FIG. 2 therefore illustrates the inner face 20*a* of the chassis member 20 (the rear face of the back face 11*b*) and predetermined components mounted on this inner face 20*a*.

As illustrated in FIG. 2, the chassis member 20 includes a plate 20A and a frame 20B joined to the outer edge of the plate 20A, for example. The standing wall 23 is formed on the frame 20B. For instance, the plate 20A includes a stack of carbon fiber reinforced resin layers. The frame 20B is a resin frame joined to the edge of the plate 20A by injection molding. The chassis member 20 may have a structure, in which the plate 20A and frame 20B are integrally formed of the same resin material or metal material.

Figure 3:
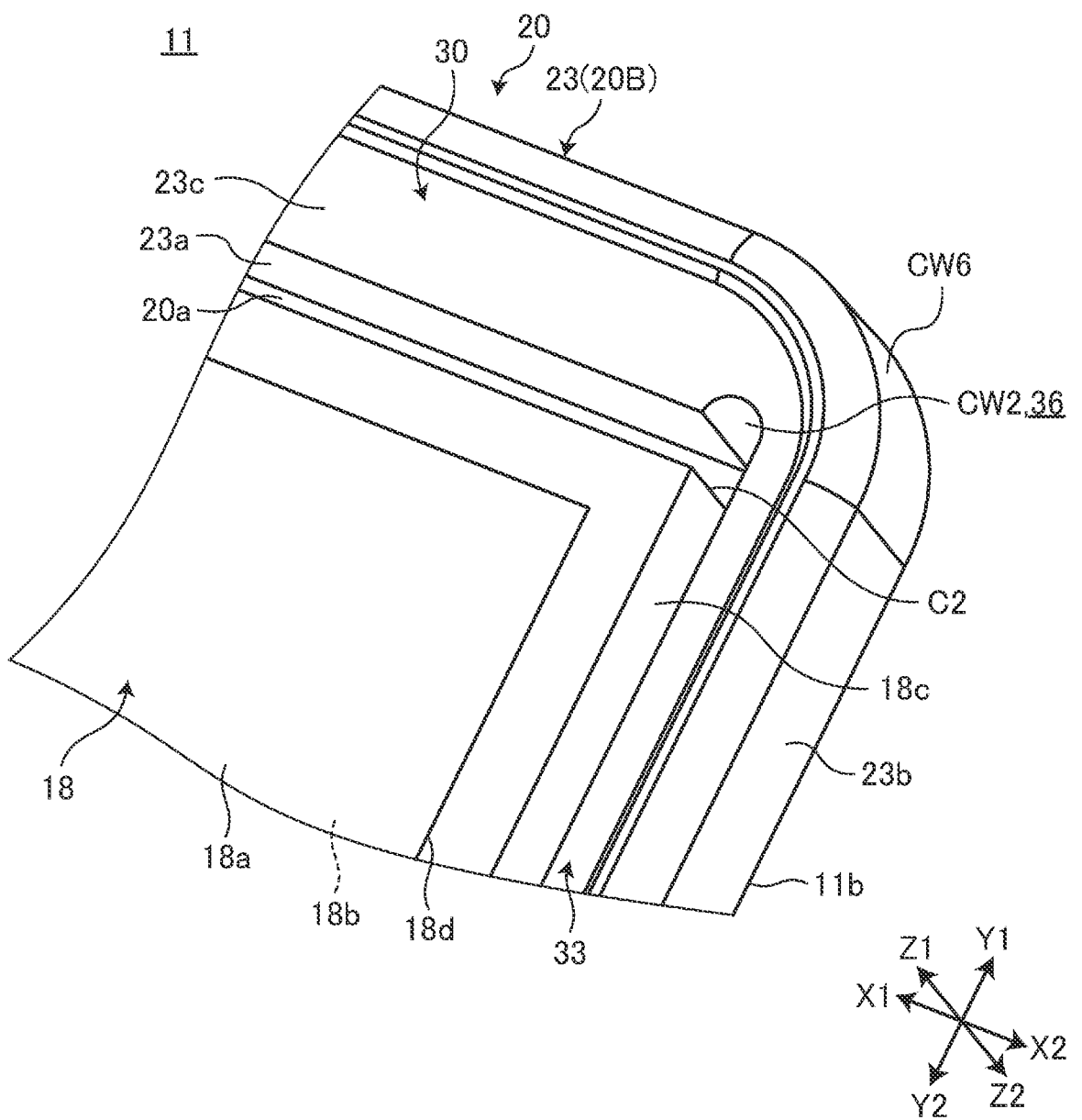
FIG. 3 is an enlarged perspective view of a portion of the chassis member and display panel.
Figure 4:
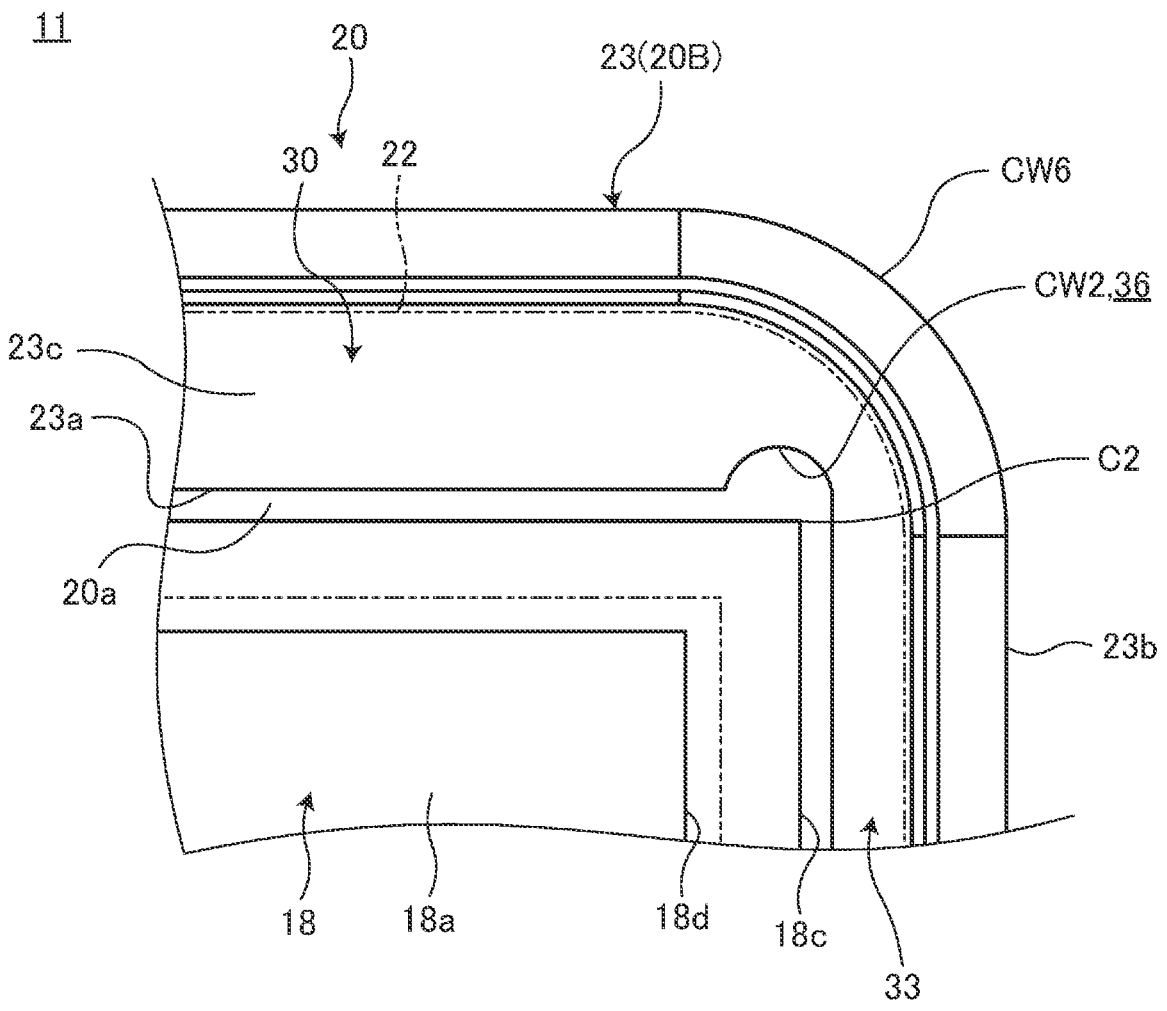
FIG. 4 is a plan view of the chassis member and display panel illustrated in FIG. 3.

FIG. 3 is an enlarged perspective view of a portion of the chassis member 20 and display panel 18. FIG. 4 is a plan view of the chassis member 20 and display panel 18 illustrated in FIG. 3.

As illustrated in FIGS. 2 to 4, the standing wall 23 has an inner wall face 23*a* facing the inside of the first chassis 11, and an outer wall face 23*b* facing the outside of the first chassis 11 on the opposite side of the inner wall face 23*a*. The inner wall face 23*a* faces the outer side face 18*c* of the display panel 18. The outer side face 18*c* is an end face that stands in the Z direction between the edges of the display surface 18*a* and the rear face 18*b*. The outer wall face 23*b* is painted on the surface, if necessary, and defines the outer surface of the chassis member 20.

The standing wall 23 has a pair of horizontal walls 30 and 31 extending in the X direction and a pair of vertical walls 32 and 33 extending in the Y direction. This allows the standing wall 23 to extend around the four perimeters of the first chassis 11.

The horizontal wall 30 on one side constitutes the Y1-side edge (edge 11*d*) of the first chassis 11. The horizontal wall 30 extends the entire length of the edge 11*d*. The first chassis 11 of the present embodiment has a protrusion 34 that bulges toward the Y1 side at the center of the edge 11*d*. The protrusion 34 is an expanded portion to install a device such as a camera module, and may be omitted. The horizontal wall 31 on the other side constitutes the edge 11*c* of the first chassis 11. The horizontal wall 31 is appropriately cut out at the center and its periphery to provide installation space for the components of the hinge 14 and the wiring that connects the chassis 11 and 12.

The vertical walls 32 and 33 extend in the Y direction and are each orthogonal to the horizontal walls 30 and 31. With this configuration, the standing wall 23 has corner wall sections CW1 to CW4 formed at the four corners of the inner wall face 23*a*. The corner wall sections CW1 and CW2 where the horizontal wall 30 intersects with the vertical walls 32 and 33 each include a recessed portion 36, the details of which will be described later. The other corner wall sections CW3 and CW4 have right-angled wall faces, for example. The standing wall 23 further has outer corner wall sections CW5 to CW8 at the four corners of the outer wall face 23*b*. These outer corner wall sections CW5 to CW8 are located outside the corner wall sections CW1 to CW4, respectively, and have arcuate (R-shaped) wall faces.

As illustrated in FIGS. 2 to 4, the display panel 18 of the present embodiment has a rectangular shape in plan view. This means that the outer side face 18*c*, which faces the inner wall face 23*a* of the standing wall 23, has corner sections C1 to C4 at the four corners.

These corner sections C1 to C4 are located at positions facing the corner wall sections CW1 to CW4 of the standing wall 23, respectively. In this embodiment, the corner sections C1 and C2 on the Y1 side and the corner wall sections CW1 and CW2, which are covered by the narrow bezel member 22, face at positions close to each other. In other words, the corner wall sections CW1 and CW2 are placed close to the corner sections C1 and C2, respectively, so as to go around the corner sections C1 and C2. This is to narrow the width of the bezel member 22. The bezel member 22 can have a width of approximately 5.5 mm, for example, in the portion that covers the horizontal wall 30, and have a width of approximately 4.5 mm, for example, in the portion that covers the vertical walls 32 and 33.

The corner sections C3 and C4 on the Y2 side covered by the relatively wide bezel member 22 are placed at a certain distance from the corner wall sections CW3 and CW4, respectively. That is, the bezel member 22 is fixed on one side in the width direction to the Z1-side surface (adhesion face 23*c*) of the standing wall 23 with double-sided tape, for example, and is fixed on the other side to the outside of the active area 18*d* (inactive area) of the display surface 18*a* with double-sided tape, for example. In this case, the metal brackets 28 and other components are placed on the edge 11*c*, so that there is a limit to narrowing the width of the bezel member 22 there. The bezel member 22 has a width of 10 mm or more, for example, in the portion that covers the horizontal wall 31. With this configuration, a certain distance is kept between the corner sections C3 and C4 corresponding to the edge 11*c* and the corner wall sections CW3 and CW4. Some structures of the hinges 14 and metal brackets 28 may allow the corner wall sections CW3, CW4 to be placed close to the corner sections C3 and C4 and go around the corner sections C3 and C4.

In this manner, the electronic apparatus 10 of the present embodiment is configured so that at least the corner sections C1 and C2 and corner wall section CW1 and CW2 face at positions close to each other. Note that the display panel 18 is fixed to the inner face 20*a* with double-sided adhesive tape 26. Thus, if the electronic apparatus 10 receives an impact such as a drop, the display panel 18 may move relative to the chassis member 20, and the corner sections C1 and C2 may collide with the corner wall sections CW1 and CW2. If this happens, one or both of the display panel 18 and the standing wall 23 may be damaged.

To suppress such a problem, the electronic apparatus 10 of the present embodiment is configured to have recessed portions 36 at the corner wall sections CW1 and CW2 of the standing wall 23. When the corner section C3, C4 and the corner wall section CW3, CW4 are close to each other, for example, the recessed portions 36 may also be placed on the corner wall sections CW3, CW4. Although FIGS. 3 and 4 illustrate the recessed portion 36 of the corner wall section CW2 on the X2 side as an example, the recessed portion 36 of the corner wall section CW1 on the X1 side may have the same or similar configuration except that it is symmetrical to the one on the X2 side.

As illustrated in FIGS. 3 and 4, the recessed portion 36 is configured to recess the inner wall face 23a defining the corner wall section CW2 in the direction away from the corner section C2 (Y1 direction). The recessed portion 36 has a pocket-like shape and serves as a relief portion for the corner section C1 and C2. The shape of the recessed portion 36 is not limited, which may be arc-shaped, rectangular, polygonal, and other shapes. The present embodiment has arc-shape recessed portions to suppress stress concentration upon impact.

In this manner, the electronic apparatus 10 of the present embodiment includes the recessed portions 36 in the corner wall sections CW1 and CW2. If the electronic apparatus 10 receives an impact such as a drop, so that the display panel 18 collides with the standing wall 23, this configuration avoids collision of the corner section C1, C2 that are edges with the corner wall sections CW1, CW2 of the standing wall 23 with impact, that is, corner collisions. That is, the electronic apparatus 10 minimizes a gap between the standing wall 23 and the display panel 18, thereby reducing the width of the bezel member 22 and improving the appearance quality. In this way, the electronic apparatus 10 reduces a gap between the standing wall 23 and the display panel 18 to a minimum, yet makes it possible to suppress problems such as damage to the display panel 18 and cracks in the standing wall 23 when receiving an impact.

A conventional electronic apparatus that does not have these recessed portions 36 requires a gap of about 1 mm between the outer side face 18c and the inner wall face 23a. In contrast, the electronic apparatus 10 of the present embodiment includes the recessed portions 36. Thus, the electronic apparatus 10 having a reduced gap of about 0.7 mm between the outer side face 18c and the inner wall face 23a withstands an impact of similar degree.

In particular, the recessed portions 36 of the present embodiment are formed in an arc shape. These recessed portions 36 further reduce stress concentration when the display panel 18 collides, and further suppress damage to the display panel 18 and the standing wall 23.

As illustrated in FIG. 4, the recessed portion 36 is recessed in the horizontal wall 30 (on the Y1 side), but not in the vertical wall 33 (on the X2 side). In other words, the recessed portion 36 is configured to recess the horizontal wall 30 in the Y1 direction along the longitudinal direction of the vertical walls 32, 33, and the vertical walls 32 and 33 are not recessed. That is, the horizontal wall 30 has the protrusion 34 and a cutout formed if necessary in its surroundings, and a device such as a camera module is installed there. Therefore, the horizontal wall 30 has a width (width in the Y direction) that is smaller than the horizontal wall 31, but that is larger than the vertical walls 32 and 33. The left and right vertical walls 32, 33 have a width (width in the X direction) that is much smaller than the horizontal wall 30 because typical laptop PCs including this electronic apparatus 10 do not have a device such as a camera module at these vertical walls 32 and 33. In one example, the thickness of the horizontal wall 30 can be about 3 to 4 mm, and the thickness of the vertical walls 32 and 33 can be about 2 to 3 mm.

For this reason, if the vertical walls 32 and 33 also have recessed portion 36, thinner portions will be formed partially in the vertical walls 32 and 33, which are originally thin. This may result in the problem of a decrease in the strength of the chassis member 20. Thus, the recessed portions 36 of the present embodiment are formed only in the relatively thick horizontal wall 30, and are not formed on the vertical walls 32 and 33. Note that the recessed portions 36 may be configured not to be recessed in the horizontal wall 30, but recessed only in the vertical walls 32 and 33.

Figure 5:
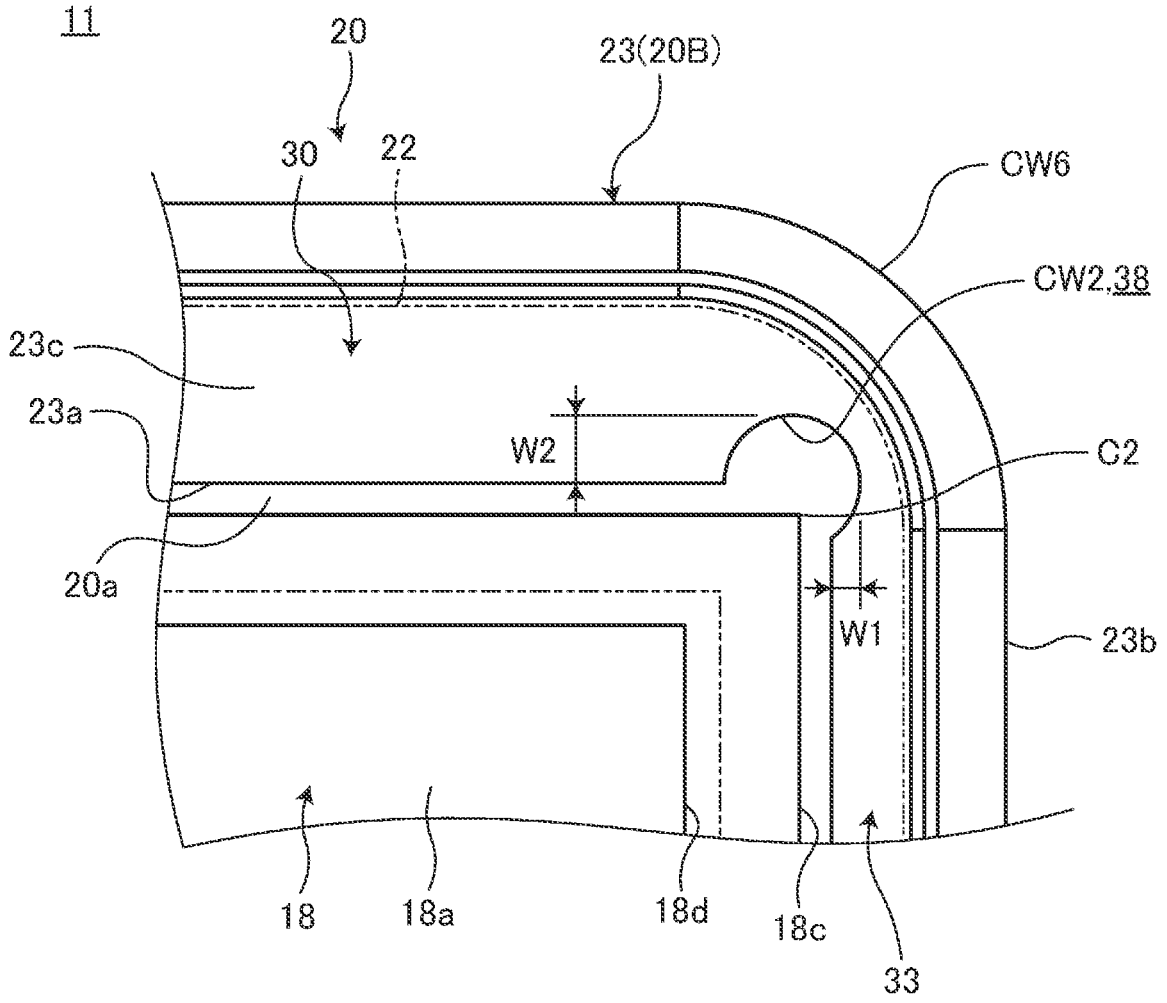
FIG. 5 is an enlarged plan view of a portion of the chassis member and display panel, including a recessed portion according to a modified example.

If the vertical walls 32, 33 have sufficient thickness, or if they have sufficient strength that is ensured by the material, a recessed portion 38 according to a modified example illustrated in FIG. 5 may be used. The recessed portion 38 is recessed in the horizontal wall 30 and in each of the vertical walls 32 and 33. Note that, if the horizontal wall 30 and the vertical walls 32 and 33 have different thicknesses as illustrated in FIG. 5, it is preferable that the recessed portion 38 have a recessed width W2 in the thicker horizontal wall 30 that is larger than a recessed width W1 in the thinner vertical walls 32 and 33. This minimizes the reduction in strength of the standing wall 23.

The bezel member 22 is fixed with double-sided adhesive tape, for example, so as to cover the Z1-side surface (adhesion surface 23c) of the standing wall 23 and the peripheral edge of the display surface 18a of the display panel 18 (see FIGS. 4 and 5). Therefore, the recessed portions 36, 38 are hidden by the bezel member 22, along with the gap between the outer side face 18c of the display panel 18 and the inner wall face 23a of the standing wall 23, and are not exposed on the exterior.

Figure 6:
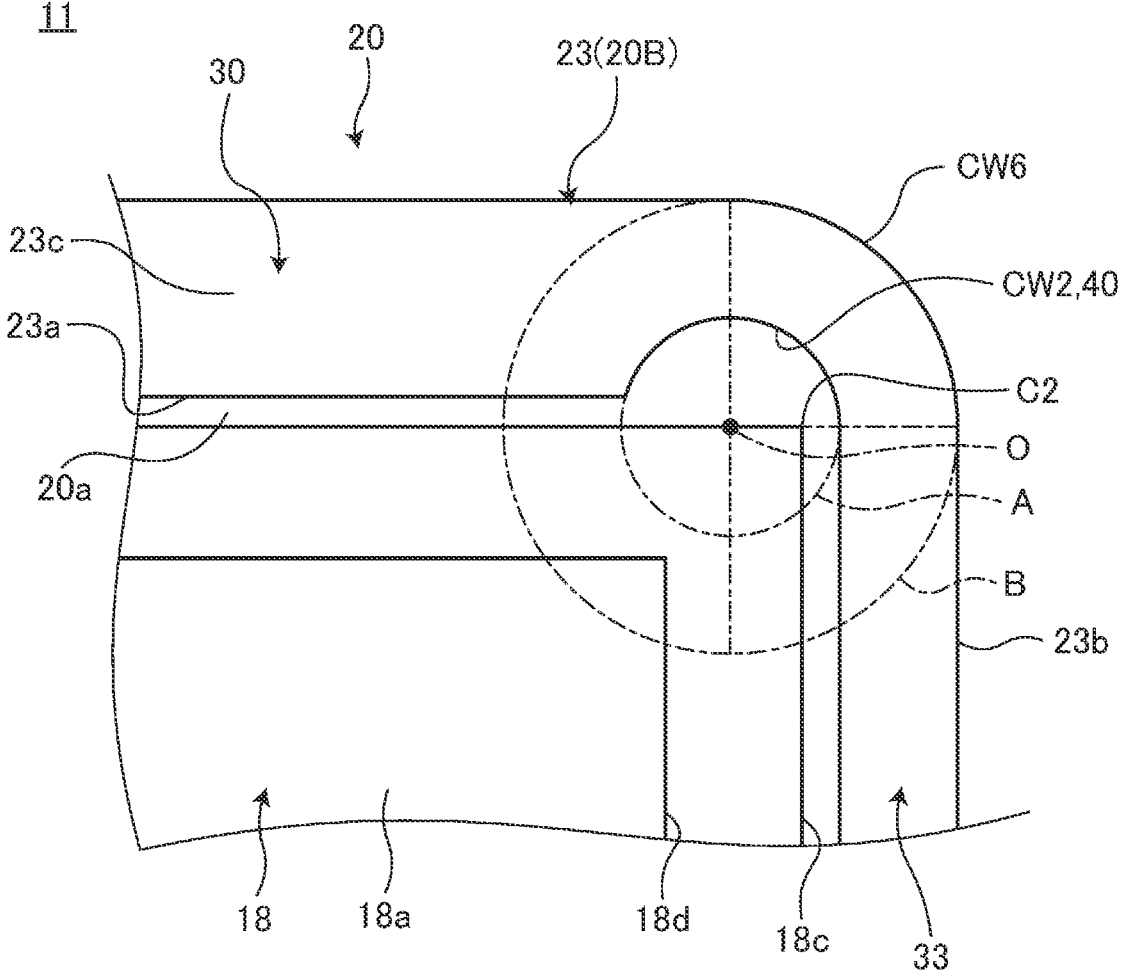
FIG. 6 is an enlarged plan view of a portion of the chassis member and display panel, including a recessed portion according to another modified example.

As illustrated in FIG. 6, the electronic apparatus 10 may include a recessed portion 40 instead of the recessed portions 36, 38. The recessed portion 40 is at least partially concentric with the outer corner wall section CW6 that defines the outer surface of the first chassis 11. A circle A indicated by a dashed-dotted line in FIG. 6 is an imaginary circle along the locus of the arc of the recessed portion 40, and has a radius of 2 mm, for example. A circle B indicated by a dashed-dotted line in FIG. 6 is an imaginary circle along the locus of the arc of the outer corner wall section CW6, and has a radius of 4.2 mm, for example. These circles A and B are concentric circles whose centers O coincide with each other. In this way, the recessed portion 40 has an arc shape that is concentric with the outer corner wall section CW6. This makes the thickness of the standing wall 23 between the recessed portion 40 and the outer corner wall section CW6 uniform, and thus further suppresses stress concentration upon impact. In particular, such a recessed portion 40 is highly effective in preventing damage to the standing wall 23 when the display panel 18 collides therewith.

The present invention is not limited to the above-described embodiments, and can be modified freely without deviating from the scope of the present invention.

The invention claimed is:

1. An electronic apparatus comprising:
a chassis member having an inner face, and a standing wall at an edge of the chassis member; and
a display panel having a display surface, a rear face opposite the display surface, and an outer side face that stands between the display surface and the rear face, the rear face being supported by the inner face of the chassis member, the outer side face facing the standing wall of the chassis member,
the display panel having a corner section on the outer side face,
the standing wall having an inner wall face facing the outer side face of the display panel, and having at least one corner wall section on the inner wall face positioned to go around the corner section of the display panel,

7 the at least one corner wall section having a recessed portion recessed in a direction away from the corner section, wherein the recessed portion on the inner wall face is recessed in a direction perpendicular to a direction of the inner wall face.

2. The electronic apparatus according to claim 1, wherein the recessed portion has an arc shape.

3. The electronic apparatus according to claim 2, wherein the standing wall of the chassis member has an outer wall face opposite the inner wall face, the outer wall face defining an outer surface of the chassis member, the outer wall face has an arc-shaped outer corner wall section opposite the at least one corner wall section, and the recessed portion and the outer corner wall section are at least partially concentric with each other.

4. The electronic apparatus according to claim 1, wherein the standing wall includes:

a vertical wall defining one side of the at least one corner wall section; and a horizontal wall orthogonal to the vertical wall and defining another side of the at least one corner wall section; and when the horizontal wall and the vertical wall have different thicknesses, the recessed portion has a first width recessed in a thicker wall between the vertical and horizontal walls, and the recessed portion has a second width recessed in a thinner wall between the vertical and horizontal walls, the first width being larger than the second width.

5. The electronic apparatus according to claim 1, further comprising:

a first chassis having the chassis member and having a rectangular outer shape;

a second chassis having a rectangular outer shape and adjacent to the first chassis; and a hinge connecting the first chassis at one edge of the first chassis and the second chassis at one edge of the second chassis in a relatively rotatable manner, wherein the standing wall has:

a pair of vertical walls extending along a pair of edges orthogonal to the one edge of the first chassis connecting with the hinge, the vertical walls defining the at least one corner wall section on one side; and a horizontal wall that extends orthogonal to the pair of vertical walls on the opposite side of the one edge of the first chassis connecting to the hinge, the horizontal wall defining the at least one corner wall section on another side, and the at least one corner wall section including a pair of corner wall sections disposed between the pair of vertical walls and the horizontal wall, the pair of corner wall sections each having the recessed portion.

6. The electronic apparatus according to claim 5, wherein the pair of vertical walls have a thickness smaller than the horizontal wall, and the recessed portions are not recessed in the pair of vertical walls, and are recessed in the horizontal wall in a direction along a longitudinal direction of the vertical walls.

7. A chassis member supporting a display panel, comprising:

a standing wall positioned to go around a corner section of the display panel, the standing wall including a corner wall section facing the corner section; and

8 a recessed portion in the corner wall section, the recessed portion being recessed in a direction away from the corner section, wherein the recessed portion is on an inner wall face of the standing wall and is recessed in a direction perpendicular to a direction of the inner wall face.

8. The electronic apparatus according to claim 1, wherein:

an outer surface of the chassis member is formed by a vertical wall of the standing wall.

9. The electronic apparatus according the claim 1, wherein:

the outer side face directly faces the inner wall face of the standing wall with a space therebetween.

10. The electronic apparatus according to claim 1, wherein:

the recessed portion on the inner wall face is recessed in a direction perpendicular to a direction along which the inner wall face next to the recessed portion is placed.

11. An electronic apparatus comprising:

a chassis member having an inner face, and a standing wall at an edge of the chassis member; and a display panel having a display surface, a rear face opposite the display surface, and an outer side face that stands between the display surface and the rear face, the rear face being supported by the inner face of the chassis member, the outer side face facing the standing wall of the chassis member, the display panel having a corner section on the outer side face, the standing wall having an inner wall face facing the outer side face of the display panel, and having at least one corner wall section on the inner wall face configured to go around the corner section of the display panel, the at least one corner wall section having a recessed portion recessed in a direction away from the corner section, wherein the standing wall includes:

a vertical wall defining one side of the at least one corner wall section; and a horizontal wall orthogonal to the vertical wall and defining another side of the at least one corner wall section, and when the horizontal wall and the vertical wall have different thicknesses, the recessed portion has a first width recessed in a thicker wall between the vertical and horizontal walls, and the recessed portion has a second width recessed in a thinner wall between the vertical and horizontal walls, the first width being larger than the second width.

12. An electronic apparatus comprising:

a chassis member having an inner face, and a standing wall at an edge of the chassis member;

a display panel having a display surface, a rear face opposite the display surface, and an outer side face that stands between the display surface and the rear face, the rear face being supported by the inner face of the chassis member, the outer side face facing the standing wall of the chassis member, the display panel having a corner section on the outer side face, the standing wall having an inner wall face facing the outer side face of the display panel, and having at least one corner wall section on the inner wall face configured to go around the corner section of the display panel, the at least one corner wall section having a recessed portion recessed in a direction away from the corner section;

a first chassis having the chassis member and having a rectangular outer shape;

a second chassis having a rectangular outer shape and adjacent to the first chassis; and a hinge connecting the first chassis at one edge of the first chassis and the second chassis at one edge of the second chassis in a relatively rotatable manner, wherein the standing wall has:

a pair of vertical walls extending along a pair of edges orthogonal to the one edge of the first chassis connecting with the hinge, the vertical walls defining the at least one corner wall section on one side; and a horizontal wall that extends orthogonal to the pair of vertical walls on the opposite side of the one edge of the first chassis connecting to the hinge, the horizontal wall defining the at least one corner wall section on another side, the at least one corner wall section including a pair of corner wall sections disposed between the pair of vertical walls and the horizontal wall, the pair of corner wall sections each having the recessed portion.

* * * * *